(12) United States Patent
Saito et al.

(10) Patent No.: US 7,099,667 B2
(45) Date of Patent: Aug. 29, 2006

(54) BASE STATION SEARCH METHOD AND MOBILE TERMINAL APPARATUS

(75) Inventors: Noriko Saito, Yokohama (JP); Roi Fujita, Zushi (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 1002 days.

(21) Appl. No.: 10/115,921

(22) Filed: Apr. 5, 2002

(65) Prior Publication Data

US 2002/0154609 A1 Oct. 24, 2002

(30) Foreign Application Priority Data

Apr. 20, 2001 (JP) ............................. 2001-122961

(51) Int. Cl.
*H04Q 7/20* (2006.01)
(52) U.S. Cl. ...................... 455/437; 455/430; 370/320; 370/331
(58) Field of Classification Search ................ 455/436, 455/437, 69; 370/320, 324, 331; 375/148
See application file for complete search history.

(56) References Cited

U.S. PATENT DOCUMENTS

| | | | | |
|---|---|---|---|---|
| 5,594,718 A | * | 1/1997 | Weaver et al. ............... | 370/331 |
| 5,649,000 A | * | 7/1997 | Lee et al. .................... | 455/436 |
| 5,697,055 A | * | 12/1997 | Gilhousen et al. .......... | 455/436 |
| 6,081,714 A | | 6/2000 | Wakizaka | |
| 6,119,004 A | * | 9/2000 | Yamada et al. ............. | 455/436 |
| 6,141,555 A | * | 10/2000 | Sato ............................ | 455/437 |
| 6,405,021 B1 | * | 6/2002 | Hamabe ....................... | 455/69 |
| 6,501,788 B1 | * | 12/2002 | Wang et al. ................. | 375/148 |
| 6,600,907 B1 | * | 7/2003 | Taguchi ....................... | 455/132 |
| 6,628,698 B1 | * | 9/2003 | Oda ............................. | 375/147 |

FOREIGN PATENT DOCUMENTS

| | | |
|---|---|---|
| JP | 10336720 | 12/1998 |
| JP | 11285046 | 10/1999 |
| JP | 2000115830 | 4/2000 |

OTHER PUBLICATIONS

English Language Abstract of JP 10-336720.
English Language Abstract of JP 2000-115830.
English Language Abstract of JP 11-285046.

* cited by examiner

*Primary Examiner*—Hassan Kizou
*Assistant Examiner*—Albert T. Chou
(74) *Attorney, Agent, or Firm*—Greenblum & Bernstein, P.L.C.

(57) ABSTRACT

The present invention uses site diversity reception and RAKE combining reception for the method for a CDMA communication mobile terminal to carry out a cell search to search for a base station with which to communicate. Even if the reception power levels of synchronization acquisition signals sent from a plurality of base stations are lower than a predetermined threshold, in the case where the power level of a signal combining those signals is equal to or greater than the predetermined threshold, the mobile terminal continues processing of requesting position registration to any one of the plurality of base stations and thereby improves communicability.

6 Claims, 9 Drawing Sheets

BASE STATION SEARCH METHOD AND MOBILE TERMINAL APPARATUS

BACKGROUND OF THE INVENTION

1. Field of the Invention

The present invention relates to a base station search method and mobile terminal apparatus in a CDMA-based mobile communication.

2. Description of the Related Art

A CDMA-based mobile communication system includes a plurality of base stations in a service area and a mobile station transmits/receives signals to/from a nearest base station.

A radio zone covered by one base station is called a "cell (or sector)".

When power is turned on, a mobile station searches for a nearest base station, then transmits/receives predetermined information to/from the searched base station and finally enters into a communication ready state (ready for receiving a call signal from the base station: standby state).

A CDMA system is broadly divided into W-CDMA system (European-Japanese system) and CDMA2000 (IS-95 system: USA system).

According to the first system, each base station operates asynchronously. On the other hand, the second system supplies each base station with an absolute time base using a GPS satellite, etc. so that each base station operates synchronously.

However, a procedure for a mobile station to search for a nearest base station (a method whereby a mobile station searches for a cell to which it belongs, and which is generally called a "cell search") is basically common to both systems.

That is, in a first stage of a cell search, the mobile station detects signals that reach a minimum reception limit level out of signals (pilot symbols included in a perch channel and long code mask symbols, etc.) sent by each base station to acquire synchronization.

Then, the mobile station selects a signal with maximum reception power out of a plurality of detected signals and then controls the phase of a despreading code in an attempt to establish synchronization with the base station corresponding to the selected signal.

In a second stage of the cell search, the mobile station requests the nearest base station with which synchronization has been established to proceed with position registration and at the same time sends information on the current reception power.

Upon receipt of a request for position registration, the base station newly registers the position of the mobile station in memory and controls the transmit power.

This allows the mobile station to perform transmission/reception with the base station and the mobile station enters into a so-called standby status.

A plurality of base stations is located in a service area in such a way that any part of the service area is covered by radio zones (cells) of any of those base stations.

However, there are actually a wide variety of topographic features and radio wave propagation environments in the regions where mobile communication services are provided and there are regions in the same service area where radio waves from base stations cannot be received with ease.

Moreover, a communication environment changes from moment to moment due to variations of weather, an amount of communication requested to one base station (amount of traffic) or construction of new buildings and so on. Therefore, even in an area where communications could be conducted under normal circumstances, communications may become impossible when unfavorable conditions are combined.

As described above, the mobile station decides whether communication is possible or not based on whether reception power of a perch channel signal (pilot symbol and long code mask symbol) received from the nearest base station reaches a minimum reception limit level or not.

That is, when the reception power of a pilot signal received from the nearest base station does not reach the minimum reception limit level, the mobile station decides that mobile station is located outside the radio zone (cell) covered by the nearest base station and stops sending a position registration request or power control information, etc.

In this condition, the base station (and a base station control apparatus) decides that there is no more mobile station that can communicate with the base station in the cell and deletes the position registration, which makes further communications impossible.

However, there are also a variety of modes in which it is difficult to receive radio waves from the nearest base station and communication is decided to be impossible in the same way as in the aforementioned case and there can also be cases where it is possible to maintain or secure communication by taking some action.

According to conventional technologies, when there is none of a plurality of received signals that exceeds the minimum reception limit level, the mobile station gives up communication of a position registration request across the board, which eliminates the possibility of communicating with the base station.

In a communication using a mobile terminal such as a cellular phone, it is extremely important to allow the user to communicate wherever the user is located.

Therefore, it is useful to allow a mobile radio terminal to access the base station more easily with high reliability even in a region where the electric field of a received signal is weak and where power of the received signal is at a minimum limit level from the standpoint of enhancing convenience of a mobile communication.

SUMMARY OF THE INVENTION

When a result of a cell search conducted by a mobile terminal shows that no received signals reach a minimum reception limit level, the present invention combines a plurality of received signals.

In the case where the level of the combined received signal exceeds the minimum reception limit level, the mobile terminal decides that there are some communicable base stations and continues a procedure for making it possible to communicate with any one of a plurality of base stations (e.g., base station corresponding to a signal with a maximum reception power value).

In the case where this improves the communication environment for the mobile terminal with time, the mobile terminal can make position registration with the base station and the mobile terminal enters into a communication ready state. This improves communicability of the mobile terminal compared to the conventional technologies.

The present invention can enhance the possibility of the mobile terminal of accessing the base station with high reliability.

That is, the present invention applies the technologies of site diversity reception and RAKE combining reception, which are the features of a CDMA communication system to measurement of the reception levels of signals for acquiring initial synchronization, which is initial processing in a cell search. This makes it possible to improve communicability in a weak electric field region quite easily and reliably.

BRIEF DESCRIPTION OF THE DRAWINGS

The above and other objects and features of the invention will appear more fully hereinafter from a consideration of the following description taken in connection with the accompanying drawing wherein one example is illustrated by way of example, in which.

DETAILED DESCRIPTION OF THE PREFERRED EMBODIMENTS

Before explaining embodiments of the present invention, features of the present invention will be explained with reference to FIG. 7.

Figure 7:
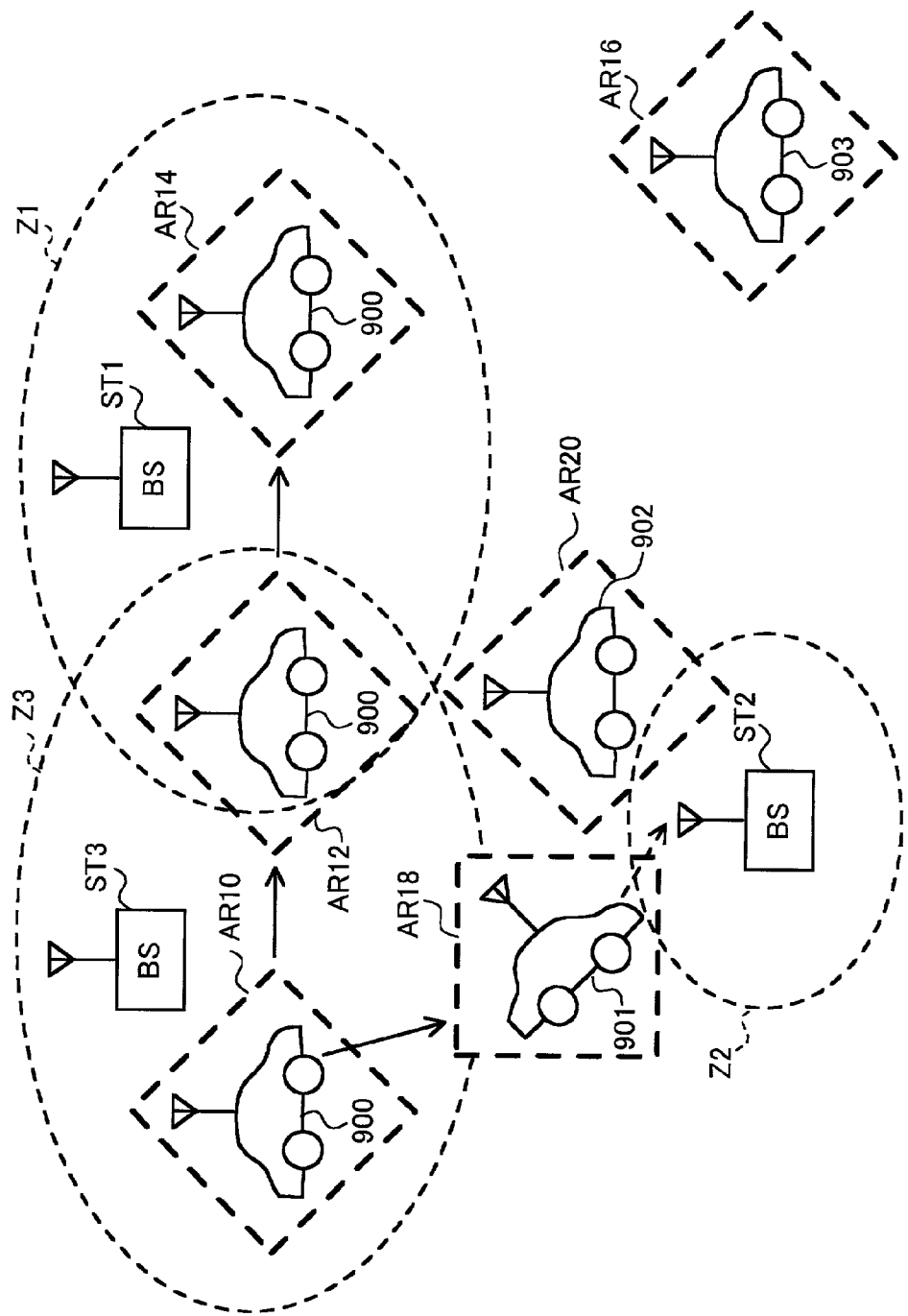
FIG. 7 illustrates a mode in which a base station search method of the present invention is actually used and features thereof.

FIG. 7 shows a case where a mobile station is put in a situation in which it is difficult to receive signals.

In FIG. 7, Z1 to Z3 indicate radio zones (cells) covered by base stations (ST1 to ST3) respectively.

When mobile station 903 is located in an area (AR16) away from all cells as shown at lower right in FIG. 7, communication is not possible and this situation cannot be helped.

However, when mobile station 901 is located in an area (AR18) near the boundary between cell Z3 and cell Z2 or when mobile station 902 is located in an area (AR20) near the boundaries with cell Z1, cell Z2 and cell Z3, there still remains a possibility of managing to communicate, though a communication environment is not favorable.

However, according to the conventional technology, when reception power of a pilot signal received from the base station does not reach a minimum limit level, the mobile station side decides across the board that the mobile station is outside the radio zone (cell) covered by the base station and gives up sending a position registration request or transmit power control signal, etc. to the base station. This eliminates the possibility of securing or maintaining communications.

A possible measure for the mobile station to handle such a case is to increase the level of a received signal itself by increasing an amplification factor of a reception amplifier when the power of the received signal is close to the minimum limit level.

However, when the reception power is low, S/N is bad and only noise is amplified in this case, which also increases the probability of erroneously recognizing instantaneous noise as a normal signal.

Moreover, it is not clear how long the amplification factor of the reception amplifier should be kept high, and there is also a problem that this measure is not a reliable measure for weak electric field areas.

Likewise, when the reception power is close to the minimum limit, it may be possible, through software control, to secure synchronization with the nearest base station and continue processing of a position registration request, etc. for the base station only for a predetermined period of time.

However, this method does not make it clear how long such processing should be continued and there is a problem in the aspect of reliability and this method is more likely to end up wasting power instead.

Nonetheless, increasing transmit power of the base station beyond an upper limit of a conventional design value will increase interference power accordingly, reducing the number of users to be accommodated in one cell.

On the other hand, widening an area where cells overlap with one another has the effect of reducing the area of the weak electric field accordingly, but this will result in narrowing of the service area and an increase of interference power, which is certainly not a realistic measure.

Thus, when the result of a cell search conducted by a mobile terminal shows that there are no received signals that reach the minimum reception limit level, the mobile terminal of this embodiment combines a plurality of received signals. Then, when the level of the combined received signal exceeds the minimum reception limit level, the mobile terminal decides that there are communicable base stations and continues a procedure for making communications with any one of a plurality of base stations (e.g., the base station corresponding to the received signal with the highest reception power value) possible.

The present invention is intended to make the most of basic functions provided for a mobile radio terminal apparatus for a CDMA communication and there is no need to provide special or dedicated circuits or dedicated software to implement the present invention.

There is no such a problem that power consumption of the circuit is increased, either. Thus, the present invention can be easily implemented.

There is a strong requirement for a mobile communication terminal represented by a cellular phone to have features like providing easy access and assuring uninterrupted communication at any place. The present invention responds to this requirement and brings about the outstanding effect of significantly improving convenience of the mobile communication terminal.

Features of the technological concept of the present invention will be explained in contrast with a so-called soft handover technology.

"Site diversity" is a technology for improving a reception situation by receiving on a same time axis signals arriving at a mobile station located near a boundary between cells from a plurality of base stations through different propagation paths, selecting and combining those signals. Since the CDMA system can distinguish between base stations using spreading codes, the CDMA system has an advantage of being capable of using a same frequency in adjacent cells (base stations).

Furthermore, if the mobile station can generate despreading codes corresponding to the respective base stations, a single receiver can receive signals sent from different base stations on a same time axis. This is "RAKE combining reception".

What is implemented using the basic technologies of site diversity and RAKE combining reception is so-called "soft handover".

As the mobile station moves, soft handover can switch the communication target from one base station to another smoothly without interrupting communication and without the user perceiving the switching.

The upper side of FIG. 7 shows an example of soft handover.

Mobile station 900 shown in FIG. 7 communicates with base station ST3 while it is located in area (AR10), carries out soft handover to communicate with base stations ST1 and ST3 simultaneously while it is located in area (AR12) and communicates with base station ST1 while it is located in area (AR14).

This soft handover takes place under the following conditions:

① Two conditions are met, that is, the electric field of radio wave arriving from one base station in communication weakens, while the electric field of radio wave arriving from another adjacent base station increases.

② Even if the above conditions are met, the reception power levels of signals arriving from the base stations should exceed a minimum communicable level. That is, it is because the mobile station is ready to communicate with a plurality of base stations that it is possible to switch the communication target from one base station to another without the user perceiving the switching.

That is, soft handover allows the mobile station to receive signals from different base stations simultaneously and switch to another communication channel before one communication channel is disconnected.

Thus, soft handover can be said to be a technology for achieving better signal reception in a reception environment in which a reception level allowing communication with each base station is secured, and this is the concept of the conventional technology.

In contrast, the concept of the present invention is completely different from the conventional concept.

That is, when the mobile station is located on a boundary between cells such as area (AR18) and (AR20) in FIG. 7 and is in a situation in which it is difficult to even secure minimum required reception power (threshold indicating a lower limit of reception power that can be received), the reception power would fall below a predetermined threshold and the mobile station would give up requesting acquisition of synchronization or position registration from the base station in the case of conventional technologies.

On the other hand, the present invention combines a received signal using site diversity and RAKE combining reception and when the level of a combined signal exceeds a threshold, the present invention regards it as if the received signal from the nearest (or optimal) base station independently exceeded the predetermined threshold and carries out processing such as requesting acquisition of synchronization and position registration from the nearest base station without giving up such processing.

This makes it possible to reduce the probability that communication with the base station will be interrupted or impaired.

That is, in FIG. 7, in the vicinity of a boundary between cells such as area (AR18) and (AR20) unlike area (AR16) which is completely outside the scope of communication, the communication environment may be improved with a change in the reception electric field or the mobile station may endure for a while continuing predetermined processing for the base station, in which case because of the movement of the mobile station itself the reception situation is likely to improve again with a considerably high probability.

Thus, in order for the mobile station to continue, without giving up, processing that is most primitive and fundamental to the base station, technologies of site diversity and RAKE combining which are basic technologies of a CDMA system and are highly reliable will be applied.

Therefore, the present invention questions whether it is possible to make a connection with the base station or not, that is, the issue of measurement and decision of a minimum reception power level and the present invention is fundamentally different from the technological concept of soft handover that aims at higher reception quality on the premise that a minimum level of reception power is secured.

Therefore, the present invention only questions whether a received signal from the optimal (nearest) base station falls below a predetermined threshold indicating the minimum reception limit or not, and the present invention has nothing to do with such processing such as observing a decrease of the level of a signal received from one base station and an increase of the level of a signal received from another base station simultaneously.

These are the explanations of the features of the present invention.

Then, a configuration example of a CDMA mobile communication system will be explained briefly using FIG. 8.

Figure 8:
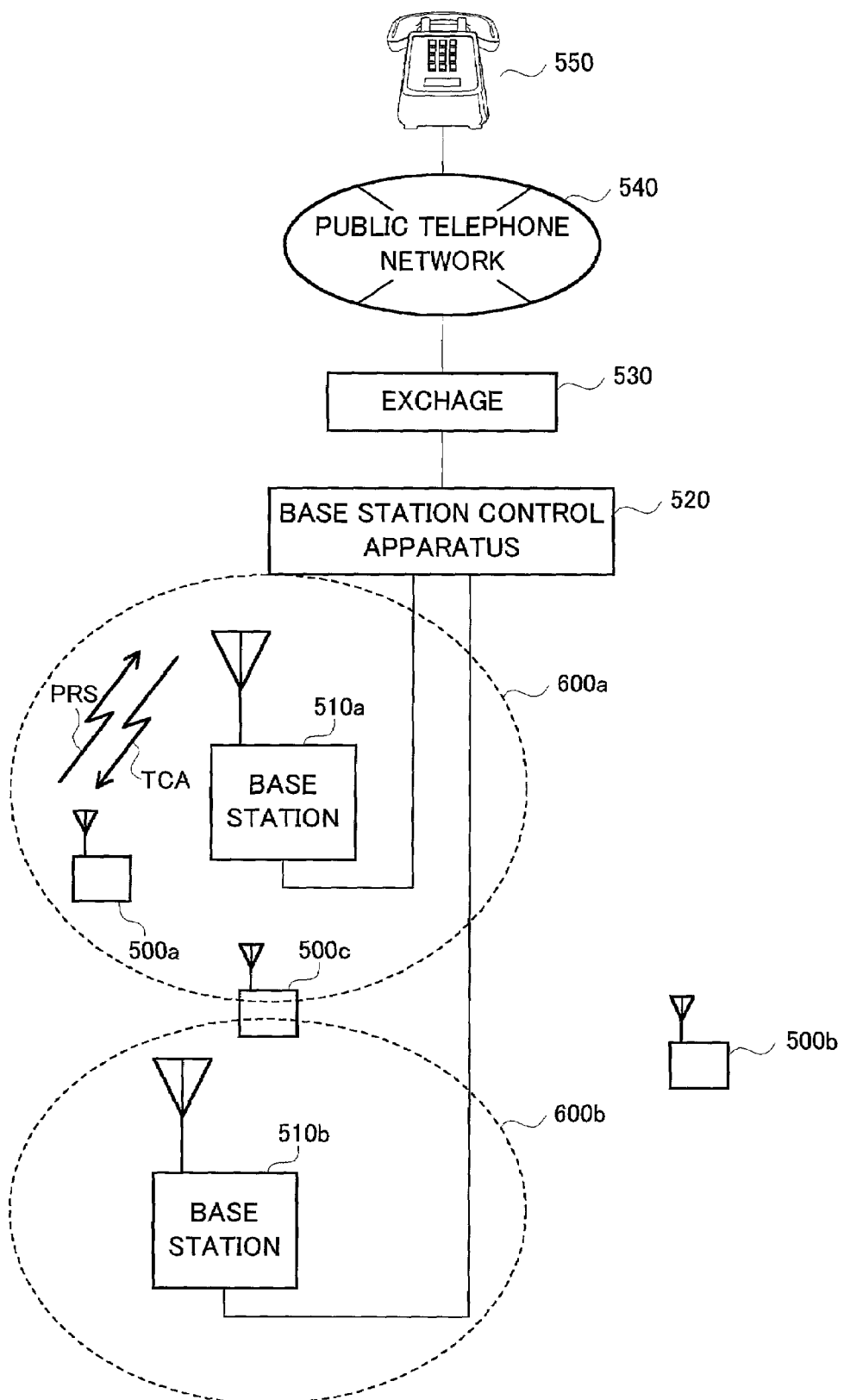
FIG. 8 is a block diagram showing an outline of a mobile communication system.

In FIG. 8, suppose a case where a communication is realized between telephone 550 at the other end of communication and mobile terminal 500*a*.

Mobile terminal 500*a* is located within cell 600*a* of base station 510*a*. When power is turned on, mobile terminal 500*a* establishes synchronization with a perch channel (TCA) signal sent from base station 510*a*.

Figure 9:
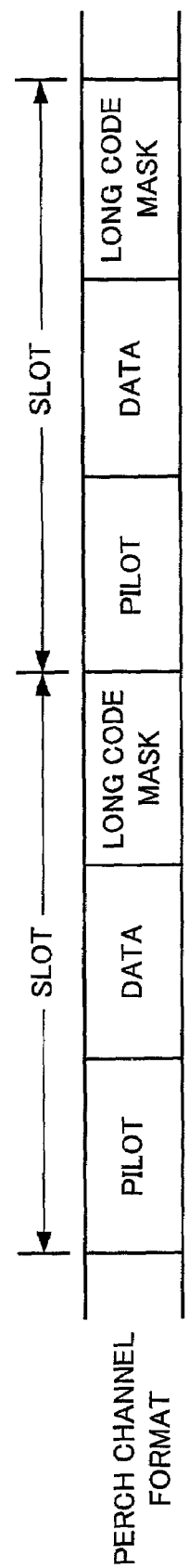
FIG. 9 illustrates a format example of a perch channel (channel to acquire initial synchronization) sent from the base station.

As shown in FIG. 9, one slot of the perch channel (TCA) includes a pilot symbol, information data and long code mask symbol.

The long code mask symbol is a symbol spread and modulated with a common spreading signal, which is used commonly by a plurality of base stations.

To acquire initial synchronization, either the pilot symbol or long code mask symbol can be used. However, these are not the only signals to be used, but other signals can also be used.

In FIG. 8, mobile terminal 500a that has established synchronization with base station 510a sends a position registration request (PRS) to base station 510a. Then, the position registration information is recorded in base station 510a and base station control apparatus 520.

This allows mobile terminal 500a to communicate with the other end of communication 550 via base station 510a, base station control apparatus 520, exchange 530 and public telephone network 540.

In FIG. 8, mobile terminal 500b cannot communicate because there are no nearby base stations.

On the other hand, mobile terminal 500c is located at a position on the boundary between cell 600a of base station 510a and cell 600b of base station 510b. Though the reception electric field at mobile terminal 500c is weak, there is a certain probability that mobile terminal 500c will be able to communicate any one of the base stations. The present invention has the effect of enhancing communicability in such a situation, that is, situation in which the mobile terminal is located in a weak electric field region.

With reference now to the attached drawings, embodiments of the present invention will be explained in detail below.

(Embodiment 1)

Figure 1:
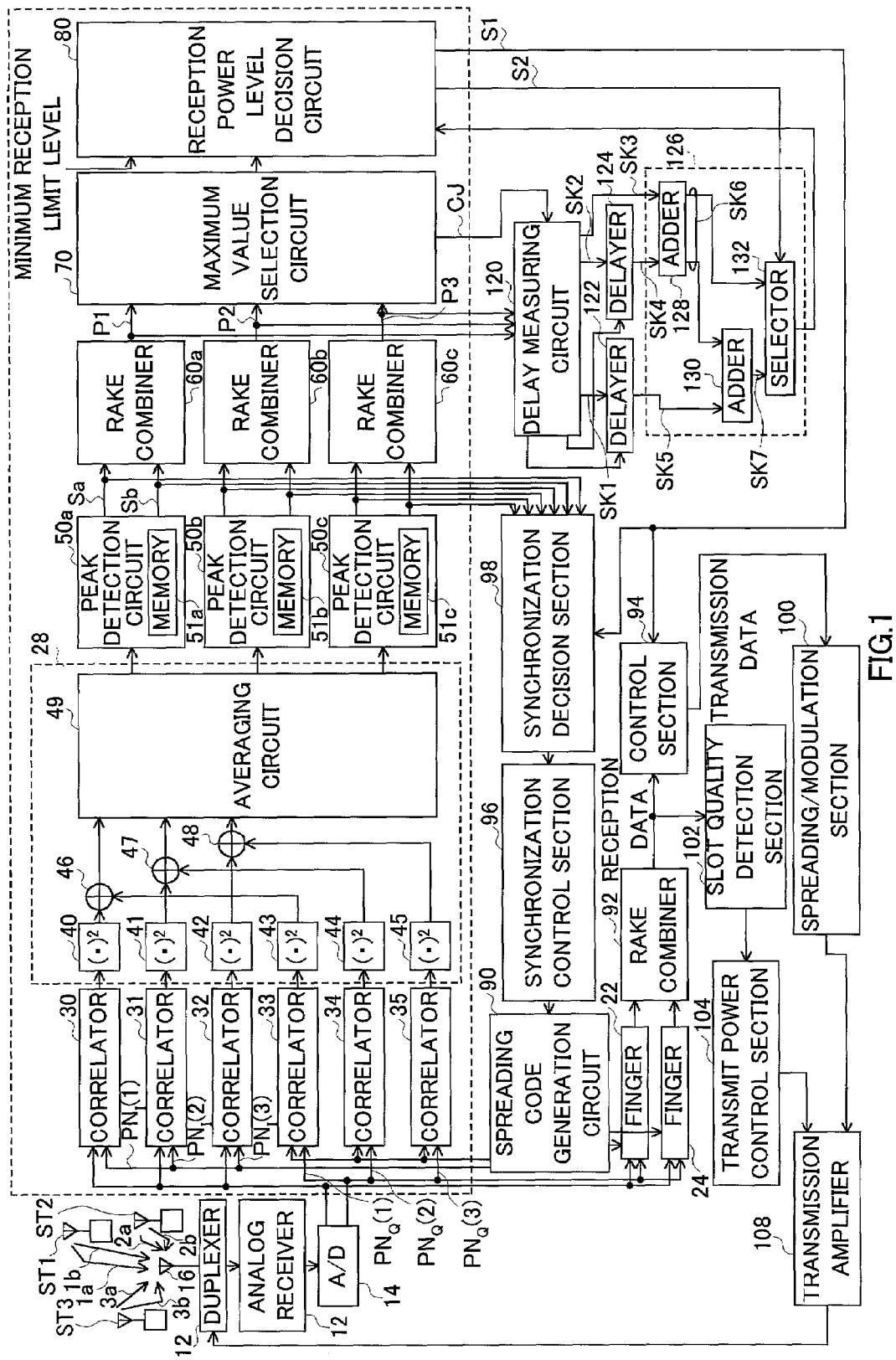
FIG. 1 is a block diagram showing a configuration example of a mobile radio terminal apparatus of the present invention.

FIG. 1 is a block diagram showing a configuration of main components of a mobile radio terminal apparatus of an embodiment of the present invention.

Suppose the mobile radio terminal apparatus in FIG. 1 is in an environment in which it is possible to receive signals sent from three base stations ST1 to ST3.

Signals from the respective base stations arrive at antenna 16 of the mobile radio terminal apparatus through different paths in a multi-path environment.

Here, for convenience of explanation, suppose a signal sent by base station ST1 arrives through paths 1a and 1b, a signal sent by base station ST2 arrives through paths 2a and 2b, and a signal sent by base station ST3 arrives through paths 3a and 3b.

A signal received by antenna 16 reaches analog receiver 12 through duplexer 10 where the signal is subjected to processing of frequency conversion and converted to a digital signal by A/D converter 14.

A/D converter 14 outputs two signals I (in-phase signal) and Q (quadrature signal).

Search finger 20 complex-multiplies the I and Q signals by spreading codes (despreading codes) assigned to base stations ST1 to ST3, obtains a correlation value for each base station and calculates reception power.

Correlators 30 to 32 are the correlators to find correlations about the I components of pilot signals (signals to acquire synchronization) sent from base stations ST1 to ST3.

In the figure, PNI(1) is a despreading code corresponding to base station ST1, PNI (2) is a despreading code corresponding to base station ST2 and PNI(3) is a despreading code corresponding to base station ST3.

Correlators 33 to 35 are the correlators to find correlations about the Q components of pilot signals (reference signals to acquire synchronization) sent from base stations ST1 to ST3.

In the figure, PNQ(1) is a despreading code corresponding to base station ST1, PNQ(2) is a despreading code corresponding to base station ST2 and PNQ(3) is a despreading code corresponding to base station ST3.

Here, reference numerals 40 to 45 denote square operators and reference numerals 46 to 48 denote adders. These operators calculate $I^2+Q^2$ and obtain reception power for the pilot signals received from the respective base stations.

The calculated reception power values of the pilot signals sent from the respective base stations are averaged by averaging circuit 49, stored temporarily in memories 51a to 51c incorporated in peak detection circuits 50a to 50c.

Peak detection circuits 50a to 50c calculate peak values corresponding to a predetermined time width (search time width) for reception power values of two systems (one is a reception power value for a signal received through path 1a and the other is a reception power value for a signal received through path 1b) obtained in connection with one base station (e.g., base station ST1). In this way, a delay profile is created.

The two peak values (reference numerals Sa and Sb in the case of peak detection circuit 50a) for each path of each base station are supplied to RAKE combining sections 60a to 60c, RAKE-combined as required and peak values P1 to P3 for the received signals of the respective base stations (ST1 to ST3) are obtained in this way.

Maximum value selection circuit 70 selects a peak value with the highest voltage level (maximum value) from among peak values P1 to P3 of the respective base stations. This makes it clear which base station is the nearest (optimal) one showing the highest correlation value.

Detected peak values P1, P2 and P3 of the respective base stations are sent to both delay measuring circuit 120 and reception power level decision circuit 80.

Delay measuring circuit 120 is also given information (CJ) of a peak level comparison result from maximum value selection circuit 70.

Delay circuit 120 measures an amount of relative delay between peak values. Delay circuit 120 then outputs the maximum value out of peak values P1 to P3 as signal SK3, then outputs the next largest signal as signal SK2 and outputs the minimum signal as signal SK1.

Furthermore, delay circuit 120 gives delayer 124 information on an amount of delay necessary to add (combine) the next largest signal SK2 to the largest signal SK3 and gives delayer 122 information on an amount of delay necessary to add (combine) the minimum signal SK1 to the combined signal.

Combination circuit 126 has two adders 128 and 130 and selector 132. Adder 128 adds up signal SK3 and delay output SK4 of delayer 124 and outputs signal SK6.

Furthermore, adder 130 adds up the output (SK6) of adder 128 and output SK5 of delay circuit 122 and outputs signal SK7.

Selector 132 has the function of controlling the output sequence such as outputting SK6 out of two input signals (SK6, SK7) in a first operation and outputting SK7 in a second operation. Based on flag signal S2 indicating whether a peak power value of a pilot signal from the nearest base station given from reception power level decision circuit 80 satisfies the minimum reception limit level or not, selector 132 also has the function of stopping output of a signal when the minimum reception limit level is satisfied.

Furthermore, reception power level decision circuit 80 compares the detected maximum value (reception power value for the pilot signal sent from the optimal base station) with the minimum reception limit level (threshold indicating a minimum receivable limit).

In the case where the maximum value detected here exceeds (satisfies) the minimum reception limit level, it is only necessary to perform synchronization acquisition processing for the nearest base station corresponding to the maximum value and processing for sending predetermined information such as position registration and power control information.

Thus, control signal S1 including identification information of the nearest base station (optimal base station with which to communicate) is notified from reception power level decision circuit 80 to control section 94 and synchronization decision section 98 of the system.

Furthermore, flag signal S2 indicating that the power value of a reception signal from the nearest base station exceeds a threshold is sent out to selector 132 and this prohibits selector 132 from outputting signals.

Synchronization decision section 98 is given information of the delay profile created by peak detection circuits 50a to 50c and synchronization decision section 98 decides whether the base station is located within a range in which synchronization follow-up processing is possible or not from the delay profile information on the nearest base station notified from reception power level decision circuit 80.

In the case where follow-up is possible, synchronization control section 96 is given phase information on the received signal of the target base station.

Synchronization control section 96 controls despreading code generation timing so as to establish synchronization with pilot signals about the nearest base station based on the given phase information.

By the way, despreading codes generated from spreading code generation circuit 90 are also given to reception fingers 22 and 24. Reference numeral 92 denotes a RAKE combining circuit.

On the other hand, control circuit 94 creates transmission data (including position registration information and information on the reception levels of pilot signals) for the nearest base station. This transmission data is spread/modulated by spreading/modulation section 100 and sent to transmission amplifier 106.

On the other hand, slot quality detection section 102 measures reception quality of the received data from the nearest base station output from RAKE combiner 92 and transmit power control section 104 gives a transmit power control signal to transmission amplifier 106 based on the measurement result.

The amplification factor of transmission amplifier 106 is controlled by the control signal given from transmit power control section 104.

Then, the transmission signal is sent to the nearest base station via duplexer 10 and antenna 16.

This is the operation when a pilot signal from the nearest base station is received with power exceeding a predetermined threshold.

When the decision result at reception power level decision circuit 80 shows that the maximum reception power level for the pilot signal received from the nearest base station does not reach the minimum reception limit level (this is not the only case, but it is also possible to include a situation in which even if the minimum reception limit level is reached, the nearest base station may still fail to achieve barely stable reception), the following operation is performed.

That is, reception power level decision circuit 80 sends flag signal S2 indicating that the maximum reception power level of a pilot signal received from the nearest base station does not reach the minimum reception limit level (lower limit threshold) to selector 132 of combination circuit 126.

Upon receipt of this flag signal S2, selector 132 selects output signal SK6 of adder 128 and sends it to reception power level decision circuit 80.

Here, output signal SK6 of adder 128 is a signal (combined signal) indicating the result of adding the next largest reception power value for a pilot signal from another base station to the maximum reception power value (signal SK3 which has not reached a lower threshold: any one of peak outputs P1 to P3 of RAKE combiners 60a to 60c).

Upon receipt of combined signal SK6 from combination circuit 126, reception power level decision circuit 80 compares SK6 with the minimum reception limit level (lower limit threshold) again.

When this result shows that the level of the combined signal exceeds the minimum reception limit level (lower limit threshold) (or when the level of the combined signal satisfies a predetermined condition such that the level of the combined signal is within a predetermined range in which reception is decided to be possible), the level of the combined signal is regarded as the maximum reception power level for the pilot signal received from the nearest (optimal) base station.

Then, control signal S1 including identification information of the nearest base station (optimal base station with which to communicate) is notified from reception power level decision circuit 80 to control section 94 and synchronization decision section 98 of the system.

On the other hand, when even the level of the combined signal does not reach the minimum reception limit level (lower limit threshold), reception power level decision circuit 80 resends flag signal S2 indicating that a predetermined condition has not been satisfied to selector 132 of combination circuit 126.

Upon receipt of this flag signal S2, selector 132 further adds the next largest reception power value (SK5) to combined signal SK6 and sends combined signal SK7 indicating the addition result to reception power level decision circuit 80.

Reception power level decision circuit 80 makes a comparison with the minimum reception limit level and in the case where combined signal SK7 exceeds the minimum reception limit level, reception power level decision circuit 80 regards the level of the combined signal as the maximum reception power level for the pilot signal received from the nearest (optimal) base station.

Then, control signal S1 including identification information of the nearest base station (optimal base station with which to communicate) is notified from reception power level decision circuit 80 to control section 94 and synchronization decision section 98 of the system.

Similar processing will be repeated until the level of the combined signal exceeds the minimum reception limit level.

Thus, according to the present invention, even if the selected signal (pilot signal) with the maximum reception power level does not reach the predetermined minimum reception limit level (or even if the selected signal does not satisfy a predetermined reception condition), the combined signal can exceed the minimum reception limit level by adding up other signals (pilot signals) which have not been selected because the reception power was not at the maximum level, which makes it easier to connect the mobile radio terminal apparatus and the base station.

In the above explanation, when the maximum reception level does not exceed a threshold, the next highest reception level is added and the maximum reception level is compared with a threshold every time the next highest reception level is added.

Figure 2A:
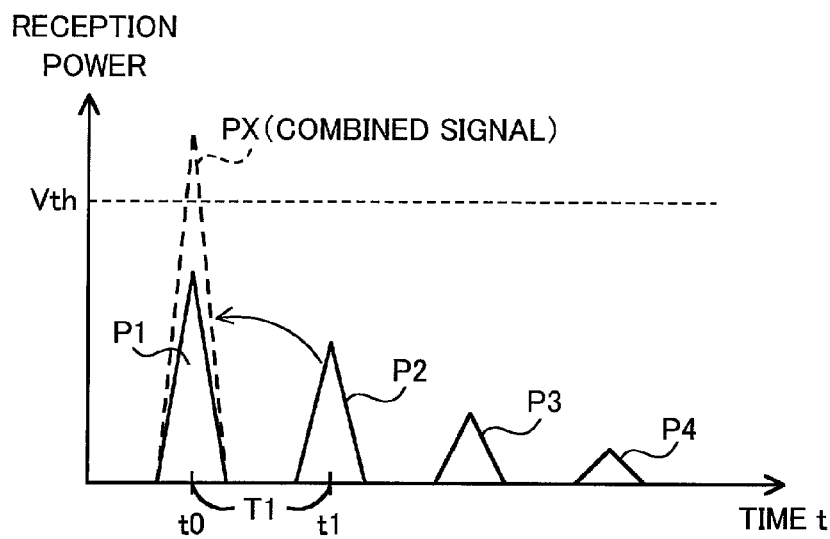
FIG. 2A illustrates an example of processing of adding up a plurality of signals showing power levels of received signals (signal combining processing)

That is, suppose a delay profile as shown in FIG. 2A is obtained (P1 is a maximum level, and the level is lowered in order of P2, P3, P4 and all these levels are below threshold Vth). Time difference T1 between maximum value P1 and the next highest peak value P2 is calculated first and the phase of any one of the peaks is shifted by the time difference and added (combined).

In the case where combined signal PX exceeds threshold Vth, maximum value P1 is regarded as having exceeded the threshold and synchronization acquisition processing and predetermined signal transmission processing are carried out.

Figure 2B:
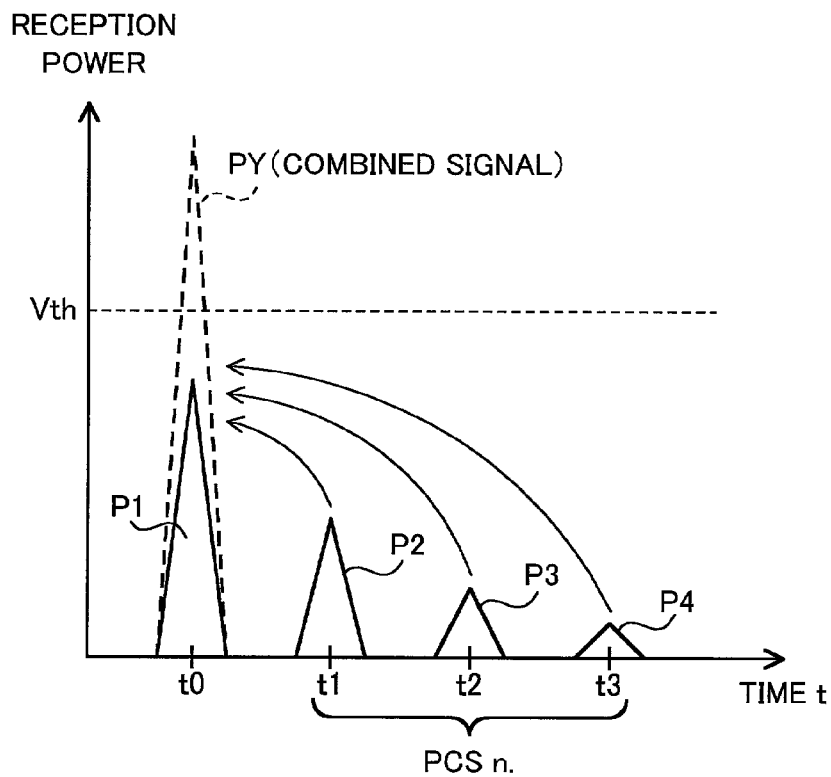
FIG. 2B illustrates another example of processing of adding up a plurality of signals showing power levels of received signals (signal combining processing)

However, this embodiment is not limited to this, but as shown in FIG. 2B, when the maximum value does not reach threshold Vth, it is also possible to add up n (natural number equal to or greater than 2) peak values all together instead of applying the system of adding one peak value. In this case, it is highly probable that combined signal PY will exceed threshold Vth and the processing is sped up accordingly.

Then, the mode in which the mobile radio terminal apparatus selects a signal from a base station will be explained using FIG. 3A to FIG. 3D taking a case where the mobile radio terminal apparatus receives signals from three base stations (ST1 to ST3) shown in FIG. 1 as an example.

As explained above using FIG. 1, the power level (reception power level after RAKE combining) of a received signal from base station ST1 is P1, the power level of a received signal from base station ST2 is P2 and the power level of a received signal from base station ST3 is P3.

Figure 3A:
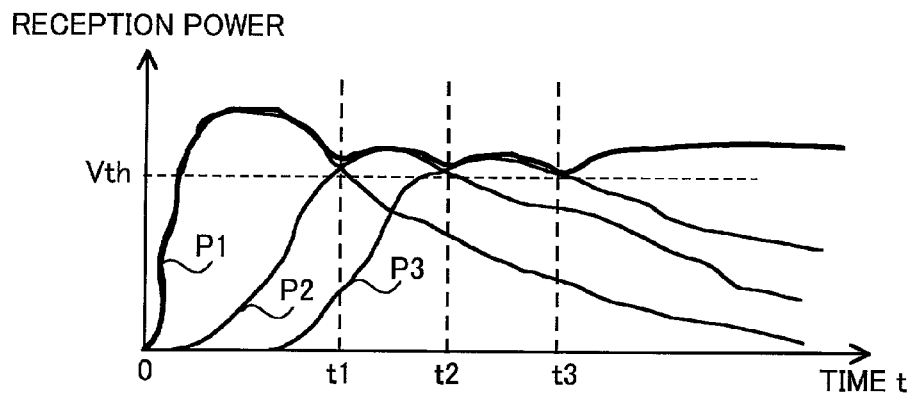
FIG. 3A illustrates, when a mobile radio terminal apparatus receives reference signals sent from three base stations, changes of their respective reception power levels with respect to the time axis and changes of maximum power levels of received signals (including a combined signal)
Figure 3B:
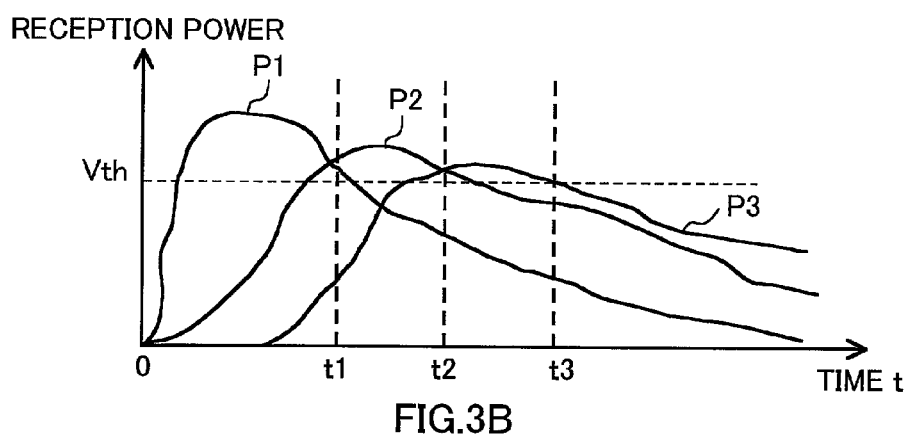
FIG. 3B illustrates, when a mobile radio terminal apparatus receives reference signals sent from three base stations, changes of their respective reception power levels with respect to the time axis.

Suppose reception power levels P1 to P3 for the respective base stations change as shown in FIG. 3B. Maximum value selection circuit 70 in FIG. 1 selects reception power level P1 until time t1, selects reception power level P2 from time t1 to t2 and selects reception power level P3 from time t2 to t3. There is no problem because all the maximum reception power levels selected exceed threshold Vth.

Figure 3C:
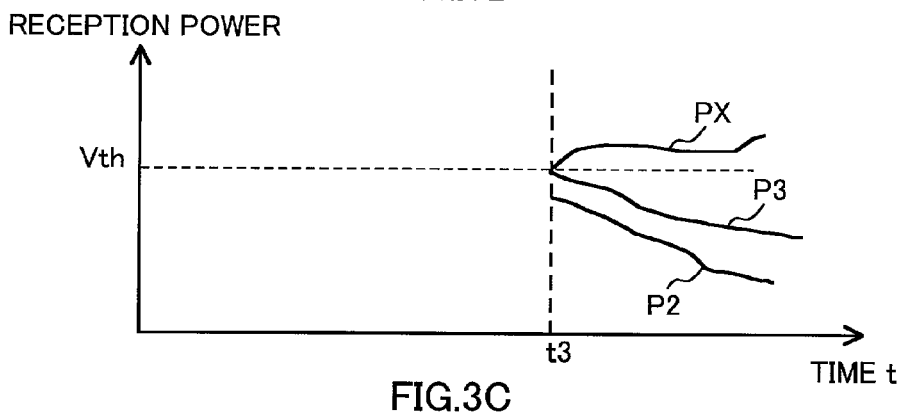
FIG. 3C illustrates changes of the reception power levels after time t3 and the level of the combined signal.

From time t3 onward, though reception power level P3 is selected as shown in FIG. 3C, the level does not reach lower limit threshold (minimum reception limit level) Vth.

Thus, processing of adding up (combining) the reception power levels is carried out, that is, level P2 is added to level P3 to obtain combined signal PX.

Figure 3D:
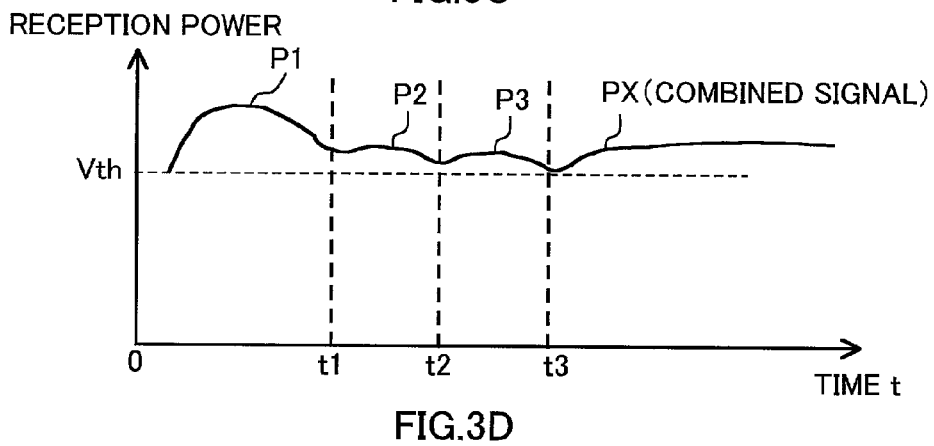
FIG. 3D illustrates a change of a maximum power level of a received signal (including a combined signal) (change in a range in excess of a predetermined threshold)

Since this combined signal PX exceeds threshold Vth, it is decided as a result that communicable base stations exist even after time t3 as shown in FIG. 3D, and synchronization acquisition processing and processing of sending predetermined information will continue.

FIG. 3A shows a trail of a maximum power value of signals received by the mobile radio terminal apparatus with a bold solid line. As shown here, even in the case where it would originally be decided to be difficult to communicate with the nearest base station and processing of maintaining a state communicable with the base station would be stopped, the present invention continues such processing as long as the level of the combined signal exceeds a threshold. Thus, it is easily accessible to a cellular phone all the more even in a region with a weak electric field and a communication is seldom interrupted. Moreover, using the most basic signal processing functions of the CDMA system (site diversity, RAKE combining) provides high reliability, imposes no considerable burden on the circuit configuration and causes no problem such as an increase of power consumption or interference.

Figure 4:
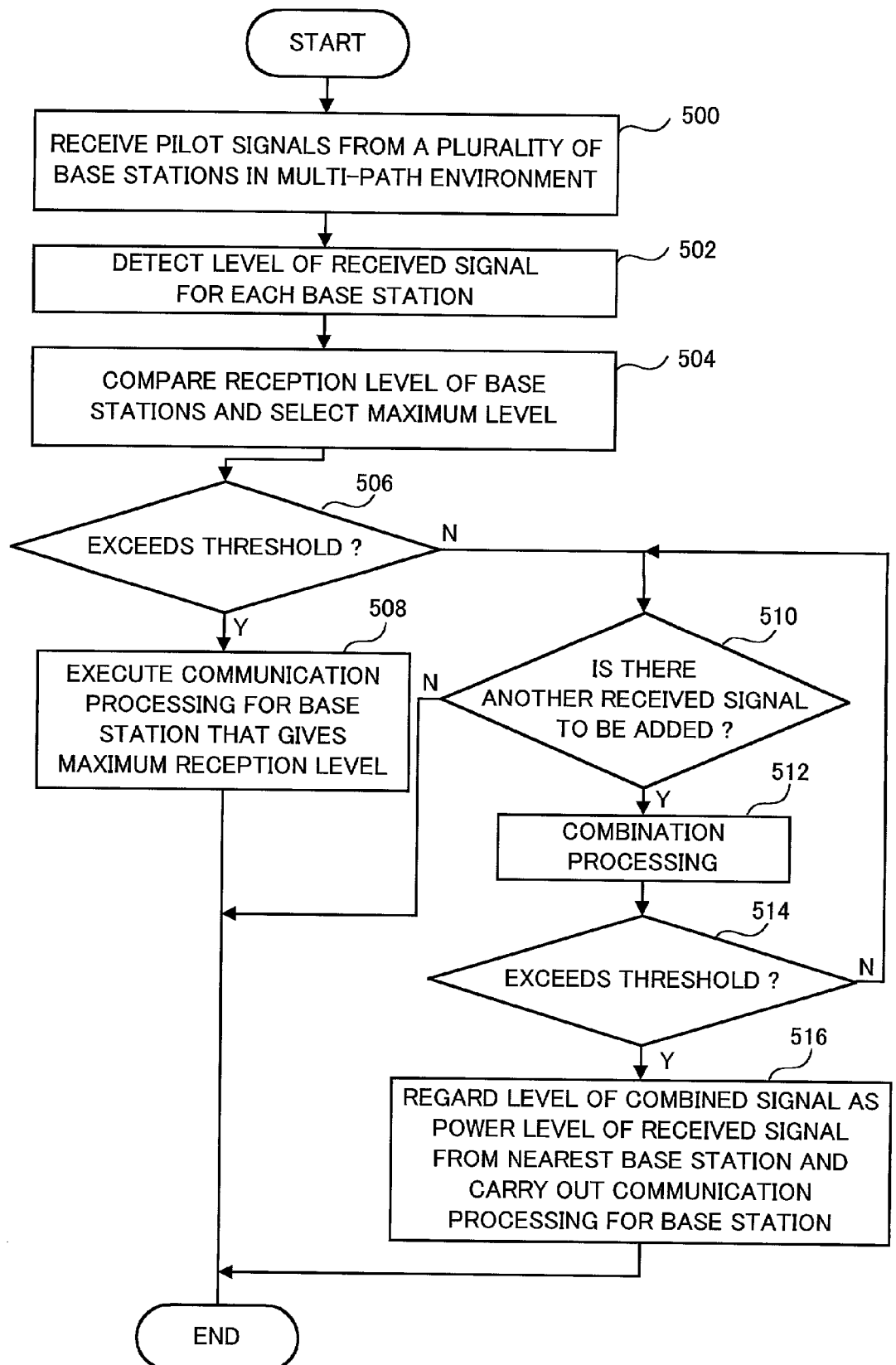
FIG. 4 is a flow chart showing an outline of an operating procedure of the mobile radio terminal apparatus shown in FIG. 1.

The above-described processing procedure will be summarized as shown in FIG. 4.

That is, pilot signals from a plurality of base stations are received in a multi-path environment (step 500).

Then, the reception level of a received signal is detected for each base station (step 502). Then, the reception levels of the respective base stations are compared and a maximum level is selected (step 504).

Then, when the selected reception level exceeds the level of a threshold (step 506), communication processing (synchronization acquisition processing, position registration request, data transmission request, transmission of reception power information, etc.) is carried out (step 508).

On the other hand, in the case where the decision result in step 506 shows that the selected reception level does not exceed the level of the threshold, combination processing is performed (step 512) when there are other received signals to be added (combined) (step 510).

Then, when the level of the combined signal exceeds the level of the threshold, the level of the combined signal is regarded as the power level of the received signal from the nearest base station and communication processing for the base station is performed (step 516).

On the other hand, in the case where the level of the combined signal does not exceed the level of the threshold, the process goes back to step 510 and similar processing is repeated until the level of the combined signal exceeds the level of the threshold.

(Embodiment 2)

Of the configuration shown in FIG. 1, this embodiment will describe specific examples of circuit configurations of the delay measuring circuit, delay circuit and reception power level decision circuit.

Figure 5:
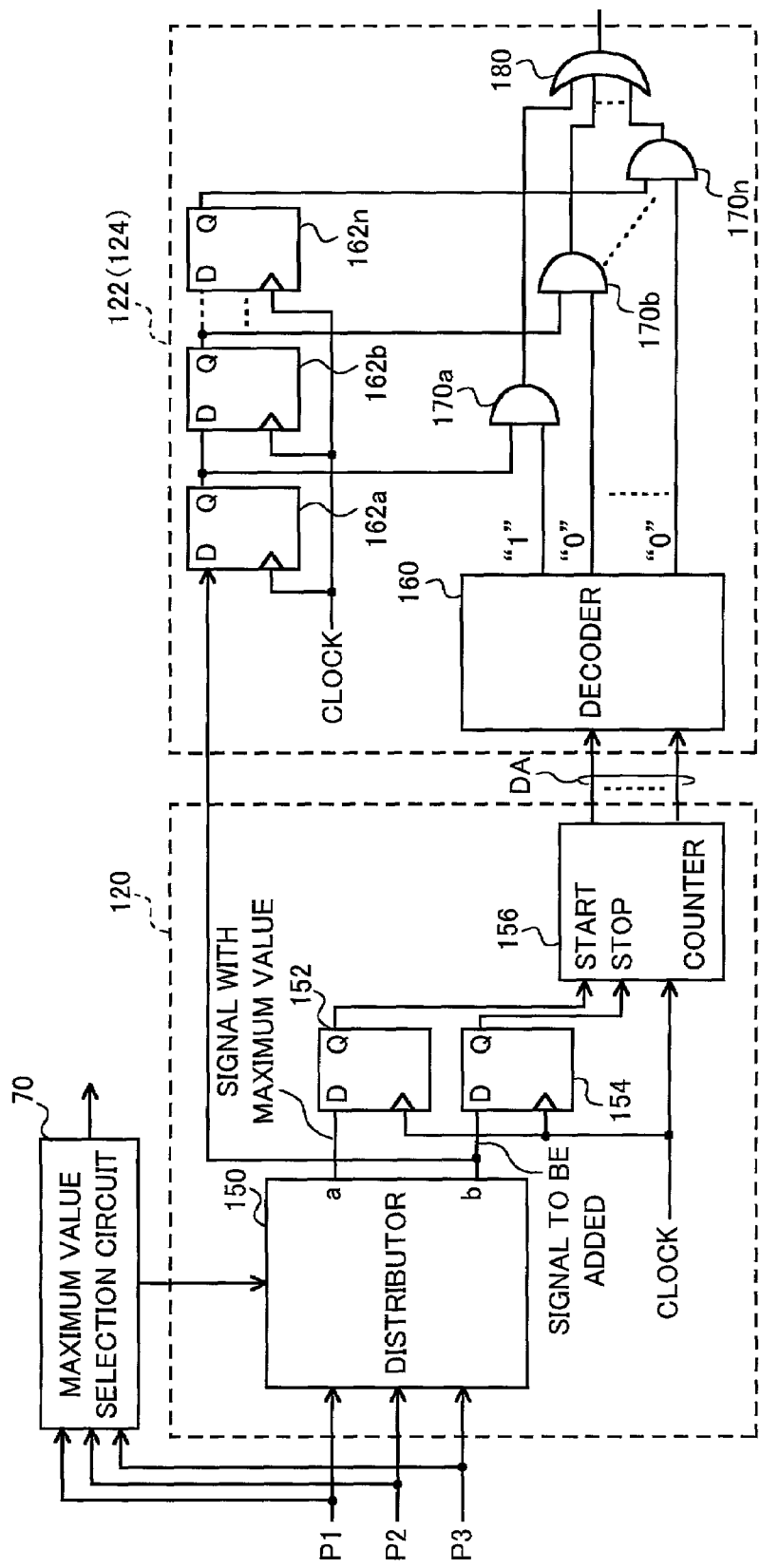
FIG. 5 is a circuit diagram showing a specific configuration example of a delay measuring circuit and a delay circuit in the mobile radio terminal apparatus shown in FIG. 1.

FIG. 5 is a circuit diagram showing specific configurations of delay measuring circuit 120, delay circuit 122 or 124.

As shown in the figure, delay measuring circuit 120 is constructed of distributor 150, counter start circuit (D type flip flop) 152, counter stop circuit (D type flip flop) 154 and counter circuit 156.

Distributor 150 selects a received signal with a maximum power level out of received signals P1 to P3 based on information indicating the result of a comparison of the power levels of received signals P1, P2 and P3 from the respective base stations and outputs from output terminal a.

Furthermore, the received signal with the next highest power level (this is the received signal to be added) is output from output terminal b.

Counter 156 starts counting of an operating clock with a Q output from counter start circuit 152 and stops counting with a Q output from counter stop circuit 154. The count value is output as data DA with a plurality of bits.

A relative time difference (delay time) of each peak, which appears in a delay profile, is measured in this way.

Delay circuit 122 (124) is constructed of decoder 160, a shift register made up of a plurality of D type flip flops 162a to 162n, AND gates 170a to 170n and OR gate 180.

Decoder 160 decodes data DA with a plurality of bits indicating an amount of delay given by counter 156 of delay measuring circuit 120 in the previous stage and outputs a decoded signal with a plurality of bits with only one bit indicating "1" and all other bits indicating "0".

Each bit of this decoded signal (DA) becomes one input signal in two-input AND gates 170a to 170n.

Furthermore, two-input AND gates 170a to 170n are each given a Q output (that is, an output signal of each tap of the shift register) of each D type flip flop (162a to 162n) making up the shift register as the other input signal.

With such a configuration, a signal to be added which is given a delay corresponding to the amount of delay measured by delay measuring circuit 120 is output via any one of AND gates 170a to 170n and OR gate 180. In this way, the phase difference of a carrier arriving at the mobile radio terminal apparatus from each base station is compensated, allowing the adders to add up (combine) the signals.

Then, the circuit configuration of reception power level decision circuit 80 will be explained using FIG. 6.

As explained above using FIG. 1, reception power level decision circuit 80 compares the power level of a received signal (or combined signal) with a minimum reception limit level (threshold level) and outputs a flag signal indicating decision result (signal indicating whether the minimum reception limit level is exceeded or not) S2 and outputs, when the power level of the received signal (or combined signal) exceeds the minimum reception limit level, control signal S1 including identification information of the nearest base station (optimal base station with which to communicate).

Figure 6:
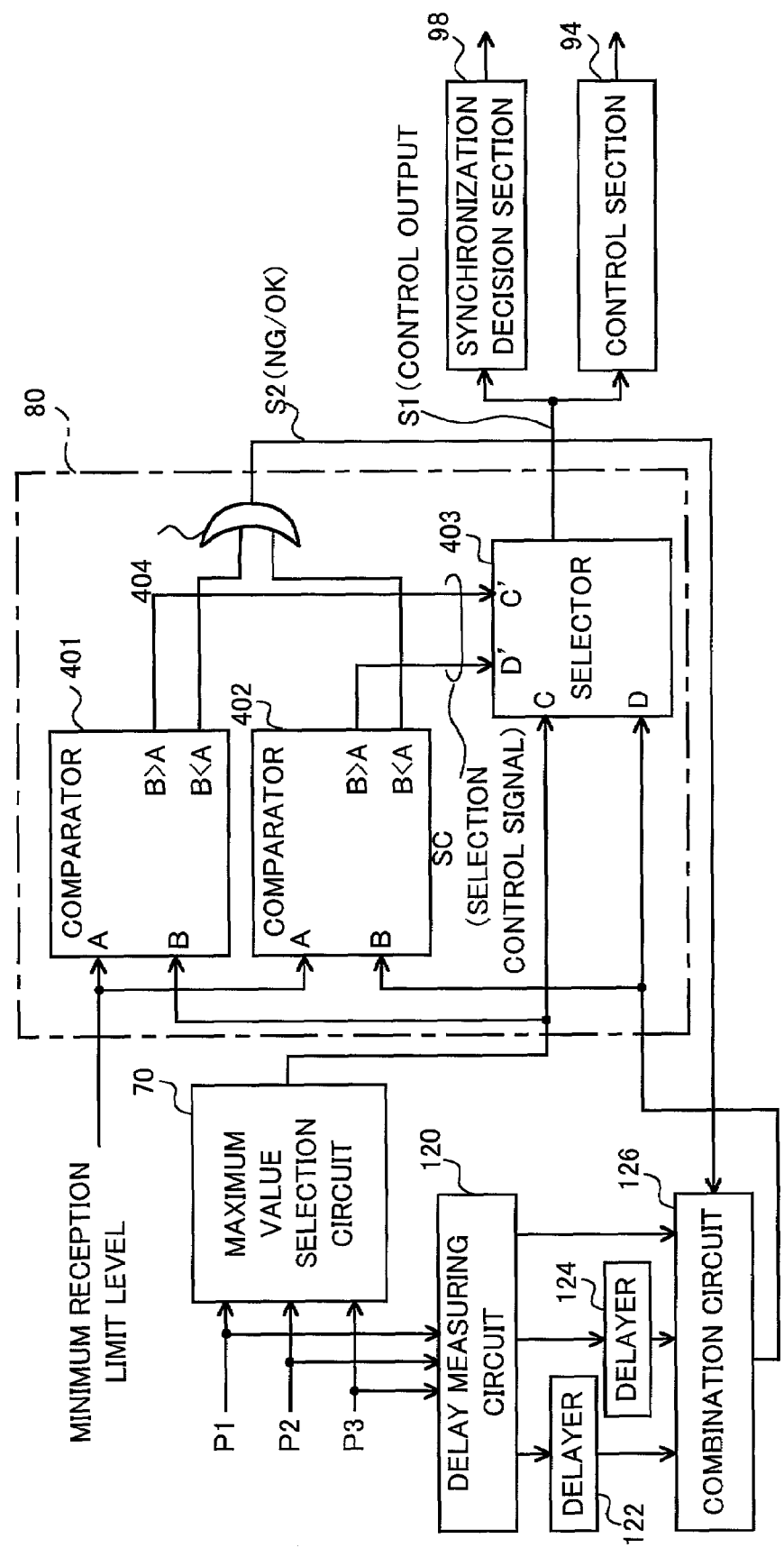
FIG. 6 is a circuit diagram showing a specific configuration example of a reception power level decision circuit in the mobile radio terminal apparatus shown in FIG. 1.

In order to implement such a function, the circuit in FIG. 6 includes comparators 401 and 402, selector 403 and OR gate 404.

Each input terminal A of comparators 401 and 402 is given a minimum reception limit level (threshold level).

Furthermore, input terminal B of comparator 401 is given a signal indicating a maximum value selected by maximum value selection circuit 70 out of the reception level values from the respective base stations.

Furthermore, input terminal B of comparator 402 is given information indicating the level of a combined signal output from combination circuit 126.

Input terminal C of selector 403 is given a signal indicating a maximum value selected by maximum value selection circuit 70 out of the reception level signals from the respective base stations. Furthermore, input terminal D of selector 403 is given a signal indicating the level of the combined signal output from combination circuit 126.

Comparators 401 and 402 compare the voltage levels of the signals given to input terminals A and B, and activate, when B>A, an output signal indicating B>A. The signals indicating B>A output from comparators 401 and 402 function as selection control signal SC at selector 403 and the signals are given to control terminal C' and control terminal D' of selector 403 respectively.

When any one of signals given to control terminal C' and control terminal D' becomes active, selector 403 selects and outputs the input signal corresponding to the activated signal.

That is, when the signal input to control terminal C' becomes active, selector 403 selects the signal given to input terminal C and when the signal input to control terminal D' becomes active, selector 403 selects the signal given to input terminal D. The selected signal is given to synchronization decision section 98 and control section 94.

On the other hand, when B<A in either comparator 401 or 402, the output of NOR gate 404 becomes active.

As a result, combination circuit 126 is instructed to output a signal indicating the result of combination processing.

As shown above, in the stage of measuring reception power of a reference signal used to acquire synchronization during search processing to search for an optimal base station with which to communicate, the mobile radio terminal apparatus carrying out a CDMA communication of the present invention receives, when the reception power level of the reference signal is close to the minimum reception limit level, the reference signal sent from each adjacent base station on the same time axis through site diversity reception, applies processing of giving a phase shift corresponding to a relative phase difference of the reference signal to any one of the received reference signals and combines a plurality of reference signals after a due time and thereby improves the reception level of the reference signal.

Thus, even if the selected reference signal with the maximum reception power does not reach the minimum reception limit level, adding up reference signals which have not been selected because their power was not the maximum power makes it possible to allow the level of the reference signal to exceed the minimum reception limit level (or satisfy predetermined conditions), making it easier to connect the mobile radio terminal apparatus and the base station.

Applying technologies of site diversity and RAKE reception, which are the features of a CDMA communication system, to measurement of the reception levels of reference signals, which is the initial processing in a cell search), makes it possible to improve communicability in a weak electric field region quite easily and reliably.

As explained above, even in a region where the electric field of a received signal is weak and power of the received signal is close to a minimum reception limit level, the present invention allows the mobile radio terminal apparatus to easily access the base station with high reliability and provides a new cell search method and a mobile radio terminal apparatus without producing adverse influences such as a reduction of the number of users who can be accommodated in one cell due to an increase of interference power.

Furthermore, the present invention is intended to make the most of basic functions provided for a CDMA communication mobile radio terminal apparatus and eliminates the need to provide special dedicated circuits or dedicated software to implement the present invention.

Furthermore, there is no problem of increasing power consumption of the circuit. Thus, it is easy to implement the present invention.

There is a strong requirement for a mobile communication terminal apparatus represented by a cellular phone to have features like providing easy access and assuring uninterrupted communication at any place. The present invention meets this requirement and has the outstanding effect of significantly improving convenience of the mobile communication terminal.

The present invention is not limited to the above described embodiments, and various variations and modifications may be possible without departing from the scope of the present invention.

This application is based on the Japanese Patent Application No. 2001-122961 filed on Apr. 20, 2001, entire content of which is expressly incorporated by reference herein.

What is claimed is:

1. A method for a CDMA communication system mobile radio terminal to search for a base station with which to communicate, comprising:

receiving synchronization acquisition signals sent from a plurality of base stations at different timings, applying despreading processing to the received synchronization acquisition signals, measuring reception power levels of the received synchronization acquisition signals, comparing the reception power levels and detecting a highest reception power level among the received synchronization acquisition signals;

comparing the detected highest reception power level with a threshold corresponding to a minimum allowable reception power level, controlling timing of the despreading processing when the detected highest reception power level is at least equal to the threshold so as to be synchronized with the synchronization acquisition signal with the detected highest reception power level and executing processing to prepare to communicate with the base station that has sent the synchronization acquisition signal with the detected highest reception power level; and when the detected highest reception power level is lower than the threshold, adding a reception power value of the synchronization acquisition signal with the detected highest reception power level to a reception power value of another synchronization acquisition signal sent from another base station which is different from the base station that has sent the synchronization acquisition signal with the detected highest reception power level, and considering, when a resultant reception power level is at least equal to the threshold, that the reception power level of the synchronization acquisition signal with the detected highest reception power is at least equal to the threshold, controlling timing of the despreading processing so as to be synchronized with the synchronization acquisition signal with the detected highest reception power level and executing processing to prepare to communicate with the base station that has sent the synchronization acquisition signal with the detected highest reception power level.

2. The method according to claim 1, further comprising: selecting other synchronization acquisition signals one at a time in descending order of reception power level and determining whether the reception power value after the addition is at least equal to the threshold each time a reception power value of a selected synchronization acquisition signal is added.

3. The method according to claim 1, further comprising: selecting a plurality of synchronization acquisition signals from other synchronization acquisition signals, adding reception power values of each of the selected synchronization acquisition signals and determining whether the resultant reception power value is at least equal to the threshold.

4. A CDMA-based mobile terminal that receives synchronization acquisition signals sent from a plurality of base stations, selects a received signal and performs processing for preparing to communicate with the base station that has sent the selected signal, comprising:
   a delay profile creation circuit that creates a delay profile for each base station based on the synchronization acquisition signals received from the plurality of base stations;
   a reception power level detection circuit that calculates a reception power level of each base station using the created delay profile;
   a combination circuit that adds reception power values of other base stations to a reception power value of one base station;
   a selection circuit that compares the reception power levels of the respective base stations and selects the highest reception power level;
   a reception power level decision circuit that detects whether either the reception power level selected by the selection circuit or the reception power level combined by said combination circuit is at least a threshold corresponding to a minimum allowable limit; and
   a control circuit that performs processing for preparing to communicate with any of the plurality of base stations when the reception power level decision circuit determines that the selected reception power level is lower than the threshold and the combined reception power level is at least equal to the threshold.

5. The CDMA-based mobile terminal according to claim 4, wherein said control circuit performs processing for preparing to communicate with a base station that sent a signal with the highest reception power level among the synchronization acquisition signals.

6. A mobile terminal that performs CDMA-based communication, comprising:
   a search correlation circuit that receives synchronization acquisition signals sent from a plurality of base stations, detects the signals, compares reception levels of the detected signals and selects a signal with the highest reception level;
   a reception power calculation section that calculates a reception power level of the selected signal;
   a decision circuit that determines whether the reception power level of the calculated signal is at least equal to a minimum reception limit level;
   a phase shift measuring circuit that measures relative phase shifts of the plurality of synchronization acquisition signals detected by said search correlation circuit;
   a phase shift circuit that shifts the phase of a synchronization acquisition signal which is not selected by said search correlation circuit so as to eliminate the phase shift measured by said phase shift measuring circuit;
   a combination circuit that adds, when the decision circuit has determined that the reception power level of the signal selected by said search correlation circuit is lower than the minimum reception level, signals output from said phase shift circuit to the selected signal with the highest reception level until the minimum reception limit level is reached; and
   a synchronization acquisition control section that determines, when said decision circuit determines that the reception power level of the signal combined by said combination circuit is at least equal to the minimum reception limit level, the range of a search to acquire initial synchronization with the base station that has sent the signal with the highest reception level selected by said search correlation circuit and executes synchronization acquisition processing.

* * * * *